United States Patent [19]

Knohl

[11] 4,139,206
[45] Feb. 13, 1979

[54] HIGH SPEED CHUCK

[75] Inventor: Kenneth F. Knohl, Logansport, Ind.

[73] Assignee: Logansport Machine Co., Inc., Logansport, Ind.

[21] Appl. No.: 800,203

[22] Filed: May 25, 1977

[51] Int. Cl.² .................................................. B23B 31/14
[52] U.S. Cl. ...................................... 279/1 C; 279/119
[58] Field of Search .......................... 279/1 C, 119, 110

[56] References Cited

U.S. PATENT DOCUMENTS

| | | | |
|---|---|---|---|
| 1,285,335 | 11/1918 | Nonneman | 279/110 |
| 2,207,621 | 7/1940 | Hite | 279/1 C X |
| 2,828,134 | 3/1958 | Buck et al. | 279/119 |
| 2,982,558 | 5/1961 | Multer | 279/1 C X |
| 3,606,364 | 9/1971 | Benjamin et al. | 279/110 |

*Primary Examiner*—John Sipos
*Attorney, Agent, or Firm*—Mason, Kolehmainen, Rathburn & Wyss

[57] ABSTRACT

A high speed chuck includes a body having a central axis around which it is rotated. The chuck also includes at least one master jaw for gripping a workpiece and a jaw operating mechanism. A jaw locking mechanism includes a wedge aligned transversely to and abutting the jaw to apply a transverse locking force that is increased by centrifugal force. The wedge also abuts a pin mounted on the body thereby maintaining the wedge in a selected initial position.

19 Claims, 3 Drawing Figures

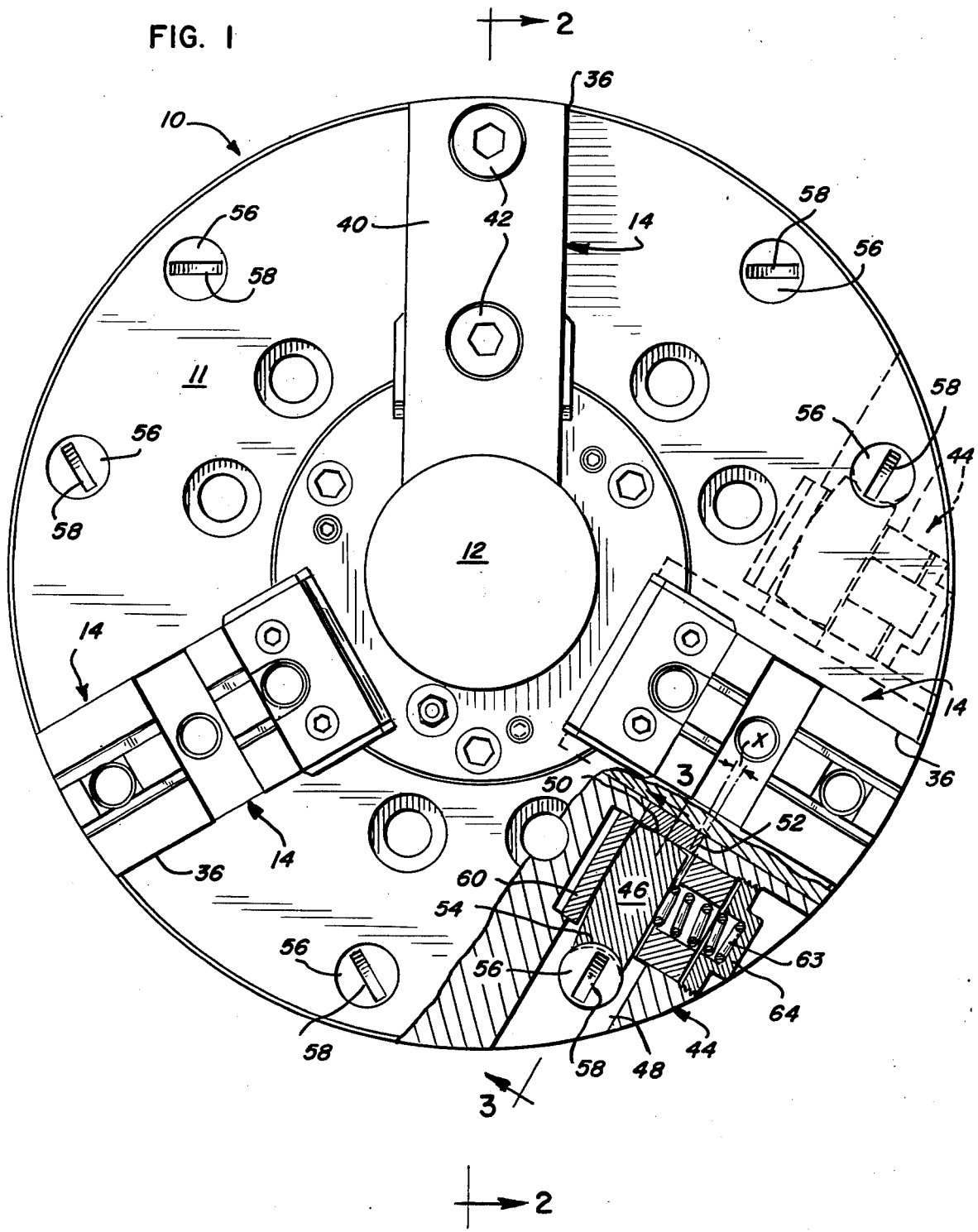

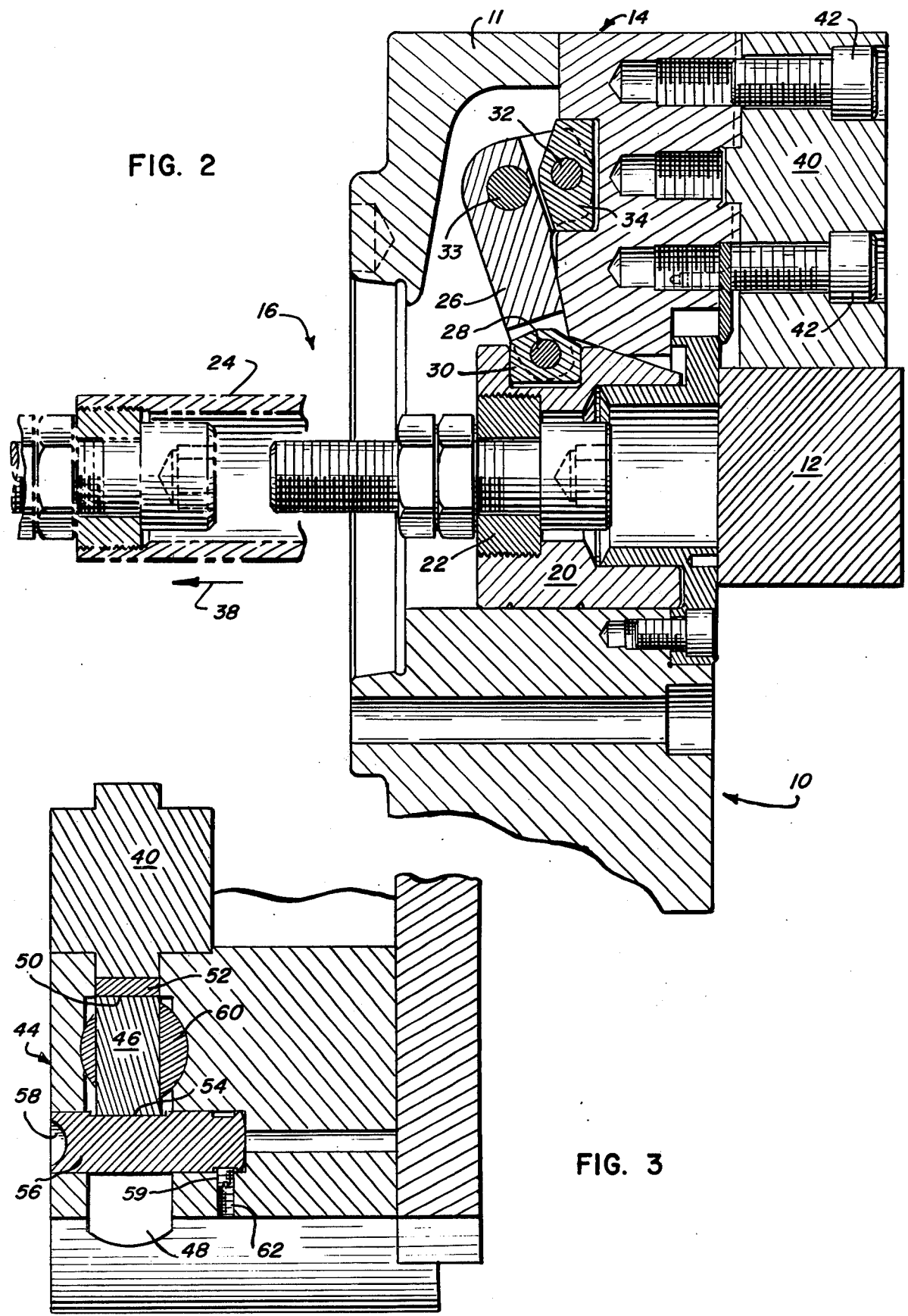

HIGH SPEED CHUCK

BACKGROUND OF THE INVENTION

A. Field of the Invention

The present invention relates to a new and improved high speed chuck that includes a locking mechanism for locking the workpiece gripping jaws in position preventing movement of the jaws due to centrifugal force developed during rotation of the chuck.

B. Description of the Prior Art

For many machining operations the workpiece being machined is rotated by a rotary chuck that includes radially movable jaws for gripping the workpiece. Because the jaws are radially mounted, they are urged to move outwardly by centrifugal force as the chuck is rotated at increasing angular velocities thereby tendint to loosen the gripping force of the jaws on the workpiece. This action results in a possible situation in which the workpiece may be released while being rotated at a high angular velocity.

To counterbalance the centrifugal force, prior art chucks employ a centrifugal counterweight. The counterweight typically is in the form of a lever mechanism that is mounted on the chuck such that as the rotational angular velocity increases, the lever pivots to apply a radially inward force on the jaw that increases with the increase in angular velocity.

The intention of these prior art devices is to counterbalance the outward centrifugal force on the jaw assembly with equal and opposite inwardly directed force. This necessitates a delicate counterbalancing. For particular installations it may be possible, in theory, to compensate exactly for the forces such that the net force on the jaws cancels out and the jaws are able to hold the workpiece with equal force at all rotational velocities. This, however, can not be uniformally accomplished for each different installation since each requires different jaw types. Accordingly, the only practical alternative available in the prior art is to overcompensate for the centrifugal forces. This prior art approach involves applying a radial force that is always larger than the centrifugal force tending to push the jaws outwardly away from the workpiece.

The net inward force in this prior art procedure is a function of the angular velocity at which the chuck is rotating. The faster the chuck is rotated the greater the force acting on the jaws to push them inwardly. This creates the problem that if the workpiece is thin-walled, the jaws can actually crush the workpiece.

Examples of the employment of levers or similar devices to provide a radially directed counteracting force is disclosed in the following U.S. Pat. Nos. 3,984,114, 3,751,053, 2,828,134, and 2,982,558.

SUMMARY OF THE INVENTION

An object of the present invention is to provide a new and improved rotary chuck that may be employed to grip a workpiece during machining.

Another object of the present invention is to provide a new and improved chuck that includes a locking mechanism for rendering ineffective the centrifugal force acting on the jaws of the chuck during rotary machine operations.

A further object of the present invention is to provide a new and improved chuck including a locking mechanism that applies a force substantially perpendicular to a radially movable jaw to prevent loosening of the jaw due to the centrifugal forces tending to move the jaw away from the workpiece.

Briefly, the present invention is directed to a new and improved chuck that includes a chuck body having a central axis defining the axis of rotation of the chuck. The chuck also includes at least one jaw mounted on the chuck body and radially movable relative to the central axis to grip a workpiece.

The jaw is actuated to grip the workpiece by a drawsleeve or similar device. The jaw during a rotating machining operation has applied to it a locking force. The locking force is applied transversely to the radius along which the jaw lies.

The transverse locking force is provided by a locking mechanism that includes a wedge or toggle mounted on the body with a first end abutting the side of the jaw. The wedge extends at a slight angle to the jaw and has a second end that abuts against a pin mounted on the body. The pin has an eccentric outer periphery such that upon rotation of the pin, the initial position of the wedge is determined.

A pressure pad may be positioned between the first end of the wedge and the jaw to provide increased frictional force between the wedge and the jaw. In addition, a weight is secured to the wedge intermediate the first and second ends that upon rotation of the chuck, enhances the centrifugal force developed tending to move the wedge to a locking position.

As the wedge approaches a position more perpendicular to the jaw, the locking force is increased. Consequently, as the chuck is rotated at greater angular velocities the increased centrifugal force moves the wedge closer to a perpendicular orientation relative to the jaw thus continually increasing the locking force and preventing jaw movement despite the increasing centrifugal force experienced by the jaw.

A biasing member such as a spring may be mounted on the body to bias the wedge away from the perpendicular orientation relative to the jaw. In the static position of the chuck, the spring tends to push the first end of the wedge out of engagement with the pressure pad such that the jaw may be moved radially to release the workpiece.

BRIEF DESCRIPTION OF THE DRAWINGS

The above and other objects and advantages and novel features of the present invention will become apparent from the following detailed description of a preferred embodiment of the invention illustrated in the accompanying drawings, wherein:

FIG. 1 is a partially cut-away, elevational view of a chuck constructed in accordance with the principles of the present invention;

FIG. 2 is a view taken along line 2—2 of FIG. 1; and

FIG. 3 is a view taken along line 3—3 of FIG. 1.

DETAILED DESCRIPTION OF A PREFERRED EMBODIMENT

With reference to the drawings, there is illustrated a chuck generally designated by the reference numeral 10. The chuck 10 includes a body 11 and is of the type employed to grip a workpiece such as the workpiece 12 and is rotated while a machining operation is performed on the workpiece 12.

The workpiece 12 is gripped by a jaw structure including a plurality of master jaws generally designated by the reference numeral 14. The master jaws 14 are actuated to effect grip and release of the workpiece 12 by a jaw operating mechanism generally designated by the numeral 16 (FIG. 2). The jaw operating mechanism 16 includes a drawsleeve 20 that is linearly actuated by a rotating cylinder (not shown) or some other device well known in the prior art through a draw rod assembly 22 or a draw tube assembly 24.

The drawsleeve 20 upon being linearly reciprocated by the draw rod assembly 22 or draw tube assembly 24, moves a lever 26 simultaneously to actuate each master jaw 14. The lever 26 is coupled to the drawsleeve 20 by a pivot pin 28 that is positioned in a lever block 30 mounted on the drawsleeve 20. The lever 26 is pivotally coupled to the master jaw 14 by a pivot pin 32 that is mounted in a lever block 34 and is pivotally connected to the body 11 by a pin 33. The lever block 34 is secured to a master jaw 14.

Each master jaw 14 is mounted within a radial slot 36 defined in the chuck body 11 such that it may be moved by actuation of the draw tube assembly 24 along a radius relative to the central axis of the body 11 and the workpiece 12. More specifically, upon actuation of the draw tube assembly 24 in the direction indicated by the arrow 38 (FIG. 2), the drawsleeve 20 moves in the direction of the arrow 38 causing the lever 26 to pivot. This action moves the master jaw 14 in an inward radial direction to grip the workpiece 12. Actuation of the draw tube assembly 24 in a direction opposite to the arrow 38 results in an opposite movement of the master jaw 14 thereby allowing release of the workpiece 12. The workpiece 12 is gripped by a plurality of top jaws 40 that are secured to the master jaws 14 by bolts 42.

To begin a machining operation on the workpiece 12, the draw tube assembly 24 is actuated in the direction of the arrow 38 causing the top jaws 40 to grip the workpiece 12 with a force designated as the initial gripping force. As the chuck 10 is rotated, centrifugal forces are developed on the jaws 14 and 40 tending to move them along a radial line away from the workpiece 12. This centrifugal force acts in a direction opposite to the initial gripping force. If the chuck 10 is rotated at an angular velocity of sufficient magnitude, the centrifugal force may exceed the initial gripping force causing the jaws 14 and 40 to release the workpiece 12.

In accordance with an important feature of the present invention, the chuck 10 includes several locking mechanisms each generally designated by the reference numeral 44. There is one locking mechanism 44 on each side of each jaw 14 and each mechanism 44 functions to prevent the jaw 14 from moving away from the workpiece 12 along a radial line under the influence of centrifugal force. Contrary to the prior art devices, each locking mechanism 44 applies a locking force transverse to each jaw 14 or substantially perpendicular to the radius along which each jaw 14 lies.

Since all the locking mechanisms 44 are identical, only one will be described.

Each locking mechanism 44 includes a wedge 46 that functions as a lever or toggle. The wedge 46 is mounted within an opening 48 defined in the chuck body 11 in a position adjacent to the jaw 14. In order to provide a substantial frictional force on the jaw 14 to prevent its movement, a pressure pad 52 is positioned between a first end 50 of the wedge 46 and the jaw 14. The pad 52 may be fabricated of ductile, heat treated material that exhibits a high coefficient of friction when unlubricated.

The wedge 46 includes a second end 54 that includes a curvilinear indentation abutting a wedge pin 56 mounted in the body 11. The pin 56 includes an eccentric outer periphery and a slot 58 at the outer end of the pin. A tool may be inserted into the slot 58 to rotate the pin 56 thereby varying the relative position of the eccentric surface against the end 54 of the wedge 46. In this manner the wedge pin 56 may be initially rotated to establish a slight angle to the perpendicular of the wedge 46 relative to the jaw 14. Once the wedge pin 56 has been rotated to the desired position, a set screw 59 received in a threaded aperture 62 in the body 11 is tightened to engage the pin 56 locking it into the desired position.

In the initial static position of the chuck 10, the wedge 46 is at a slight angle x (FIG. 1) to perpendicular relative to the wedge pad 52 and the jaw 14. This angle x is in the order of 3° but is greatly exaggerated in FIG. 1 for illustration purposes. The initial position is accomplished by placing the wedge 46 at the preferred angle x and rotating the wedge pin 56 to lock the wedge 46 in this initial non-perpendicular position.

It is the function of the wedge 46 to tend to rotate or pivot slightly about the pin 56 in a direction away from the axis of rotation of the chuck 10. The wedge 46 pivots under the influence of centrifugal force upon the rotation of the chuck 10 aligning itself more nearly along a line perpendicular to the jaw 14. As this rotation of the wedge 46 occurs, it functions as a lever or as a toggle greatly increasing the mechanical advantage of the locking force. More specifically, as the wedge approaches a 90° orientation relative to the jaw 14, the mechanical advantage approaches infinity. For at this position, the wedge 46 is substantially perpendicular to the jaw 14. To enhance the influence of the centrifugal force, a weight 60 is mounted on the wedge 46.

The end 50 of the wedge 46 is curved as opposed to being flat with sharp corners. This provides a desirable stress distribution on the wedge 46 and the wedge pad 52 during operation of the chuck 10. If a sharp edge or corner were defined on the end 50 of the wedge 46, stresses would be concentrated along this corner resulting in an undesirable and destructive effect. In addition, the curved end 50 tends to provide a rolling motion to the very slight extent that the end 50 of the wedge 46 actually moves relative to the wedge pad 52 as the wedge moves toward its 90° orientation relative to the jaw 14 upon rotational acceleration of the chuck 10.

In order to return the wedge 46 to its initial position illustrated in FIG. 1 at the completion of the rotation of the chuck 10, a spring 63 is included. The spring 63 extends through an aperture 64 in the weight 60 and engages the side of the wedge 46. The spring 63 does not provide a large enough biasing force to prevent the action of the wedge 46 as the rotation of the chuck 10 is increased; however, upon deceleration of the chuck 10 as a centrifugal force drops below a predetermined magnitude, the spring 63 biases the wedge 46 to its original position illustrated in FIG. 1. In this manner, the locking force applied by the wedge 46 on the jaw 14 is released such that the draw tube assembly 24 may be actuated to move the jaw 14 away from the workpiece 12 thereby allowing the workpiece to be removed from the chuck 10.

While the invention has been described with reference to details of the illustrated embodiment, it should be understood that such details are not intended to limit the scope of the invention as defined in the following claims.

What is claimed and desired to be secured by Letters Patent of the United States is:

1. A chuck for gripping a workpiece during a rotary operation comprising:
   a body including a central axis:
   jaw means mounted on said body and movable radially relative to said axis to grip said workpiece;
   actuation means for actuating said jaw means;
   toggle means for locking said jaw means in a workpiece gripping position during rotation of said chuck, said toggle means including a toggle member positioned on said body transverse to said jaw means with a first end abutting said jaw means for applying a centrifugally actuated transverse locking force on said jaw means during rotation of said chuck;
   biasing means for biasing said toggle means to a jaw unlocking position upon termination of the rotation of said chuck; and an eccentric pin rotatably mounted on said body and abutting said toggle member, said pin being rotatable to press on said toggle member to thereby move said member toward said jaw thereby applying an initial transverse locking force on said jaw.

2. The chuck claimed in claim 1 wherein said toggle means further includes a friction pad positioned between said first end of said toggle member and said jaw means.

3. The chuck claimed in claim 1 wherein said toggle means further includes a weight secured to said toggle member.

4. The chuck claimed in claim 1 wherein said toggle means further includes biasing means positioned on said body for biasing said toggle member toward said central axis, said biasing member providing a preselected biasing force on said toggle member.

5. The chuck claimed in claim 1, said first end of said toggle member being curvilinear.

6. A rotating chuck for gripping a workpiece comprising:
   a body;
   at least one jaw radially mounted on said body and operable to grip said workpiece by radial movement of said jaw,
   operating means for operating said jaw;
   a lever assembly for locking said jaws in position against the influence of centrifugal force with an increasing magnitude of locking force as the angular velocity of said rotating chuck increases;
   said lever assembly including a lever mounted on said body transverse to said jaw, said lever being at an angle relative to the movement of said jaw during the static, non-rotating position of said chuck, said lever further including a first end adjacent said jaw, said lever pivotally mounted in said body and pivoted by centrifugal force upon rotation of said chuck to apply a locking force transverse to said jaw wherein said lever assembly further includes a pin mounted in said body, said pin including an eccentric periphery, said lever including a second end abutting said periphery of said pin, said pin being rotatable to press on said lever to thereby move said lever transversely relative to said jaw to apply an initial locking force on said jaw.

7. The chuck claimed in claim 6 said first end of said lever being generally spherical.

8. The chuck claimed in claim 6 said lever assembly further includes a weight secured to said lever.

9. The chuck claimed in claim 6 said lever assembly further includes a biasing member mounted in said body and abutting said lever tending to bias said lever out of engagement with said jaw.

10. A chuck for gripping a workpiece during a rotary machining operation, said chuck and said workpiece being rotated at a high angular velocity during said operation, said chuck comprising:
    a body including a central axis defining the axis of rotation of said chuck;
    at least one workpiece gripping jaw slideably mounted on said body, said jaw being aligned along a radius of said body;
    actuating means for actuating said jaw to grip said workpiece; and
    centrifugally operated locking means for locking said jaw in a workpiece gripping position during rotation of said chuck, said locking means including a lever mounted on said body and extending substantially transversely relative to said jaw in a static, nonrotating chuck position, said lever including a first end abutting said jaw and a second end, and a pin secured to said body, said second end of said lever abutting said pin said pin including an eccentric periphery abutting said second end of said lever and rotatable to press on said lever to thereby move said lever transversely to said jaw to provide a variable initial locking force on said jaw.

11. The chuck claimed in claim 10 wherein said lever extends at a slight angle to the perpendicular of said jaw during the static, nonrotating position of said chuck, said lever being moved by centrifugal force to a position more nearly perpendicular to said jaw upon rotation of said chuck.

12. The chuck claimed in claim 10 said locking means further including a weight secured to said lever intermediate said first and second ends.

13. The chuck claimed in claim 10 wherein said locking means further includes a biasing member mounted on said body and engaging said lever to bias said lever to said static position.

14. A rotating chuck for gripping a workpiece comprising a body, a plurality of jaws, a plurality of radial recesses in said body mounting said jaws for radial movement, means for simultaneously sliding said jaws into gripping relation with a workpiece, at least one recess including means for providing a surface against which the corresponding jaw is in sliding engagement, and the improvement characterized by:
    a pressure member engageable with said jaw opposite said surface means for pressing said jaw against said surface means;
    a weight supported in said body subjected to centrifugal force upon rotation of said body; and
    coupling means for applying said centrifugal force to said pressure member wherein said coupling means, comprises a lever aligned at an angle relative to the perpendicular of said surface means said lever being interposed between said pressure member and an adjustable member movable toward and away from said pressure member for altering said angle, said adjustable member is an eccentric member rotatable around an axis generally parallel to the axis of the chuck to press on said lever to thereby move said lever toward said jaw.

15. The chuck of claim 14 wherein said coupling means comprises a force amplifier.

16. The chuck of claim 15 wherein said force amplifier is a toggle.

17. The chuck of claim 15 wherein said force amplifier is a wedge.

18. The chuck of claim 14 wherein said weight is coupled to said lever to tend to decrease said angle with increasing centrifugal force.

19. The chuck of claim 18 further comprising a spring biasing said lever in the direction to increase said angle.